United States Patent [19]

Windstrup et al.

[11] Patent Number: 4,762,486
[45] Date of Patent: Aug. 9, 1988

[54] BLOW MOLDING MACHINE

[75] Inventors: Robert F. Windstrup, Oak Park; Steven A. Bodnar, Harwood Heights; B. Pershing Larsen, Chicago, all of Ill.

[73] Assignee: The Continental Group, Inc., Norwalk, Conn.

[21] Appl. No.: 25,752

[22] Filed: Mar. 13, 1987

Related U.S. Application Data

[62] Division of Ser. No. 103,690, Dec. 14, 1979, Pat. No. 4,650,412.

[51] Int. Cl.$^4$ .............................................. B29C 49/56
[52] U.S. Cl. ................................... 425/541; 425/451; 425/451.7; 425/451.9; 425/540
[58] Field of Search ...................... 425/539–541, 425/589, 592, 593, 595, 451, 214, 451.4, 451.5, 451.6, 451.7, 451.9; 264/520, 521, 543; 72/431–434; 100/259; 417/540–543

[56] References Cited

U.S. PATENT DOCUMENTS

| | | | |
|---|---|---|---|
| 3,079,631 | 3/1963 | Gasmire | 425/541 X |
| 3,267,184 | 8/1966 | Nowicki et al. | 425/541 X |
| 3,457,765 | 7/1969 | Heiser | 72/432 |
| 3,782,879 | 1/1974 | Mnilk et al. | 425/541 X |
| 3,829,264 | 8/1974 | Mnilk et al. | 425/541 X |
| 3,833,333 | 9/1974 | Britten | 425/451 X |
| 3,918,872 | 11/1975 | Logomasini et al. | 425/540 X |
| 4,025,266 | 5/1977 | Linde et al. | 425/451.7 X |
| 4,032,277 | 6/1977 | Linde et al. | 425/451.7 X |
| 4,257,254 | 3/1981 | Adamus et al. | 72/432 |
| 4,272,980 | 6/1981 | Carrieri | 72/432 X |

Primary Examiner—Richard L. Chiesa
Attorney, Agent, or Firm—Charles E. Brown; Paul Shapiro; Charles A. Brown

[57] ABSTRACT

This relates to a blow molding machine of the type for blow molding large articles such as containers of the one gallon to five gallon size from a parison in the form of an extruded plastic material tube. The machine is of the rotary type and has a plurality of stations each carrying a mold unit of which one half is fixed and the other is mounted for radial movement between open and closed positions. The main shaft of the machine is of a large diameter and is tubular so that the necessary manifolding for gas and coolant supplies may be readily incorporated in the main shaft in an entirely different manner from that heretofore utilized. Also, among other features of the machine, is the provision of hollow spokes which serve not only to support outer mold halves for radial movement, but also serve as manifold accumulators for the necessary operating gases. There is also a new cushioning pad arrangement which holds the mold halves together under a light initial pressure facilitating the latching of the molds to a closed position with a minimum of camming force, after which the necessary pressure may be applied against the movable mold half so as to compensate for the opening pressures developed within the mold during the blow molding operation.

3 Claims, 12 Drawing Sheets

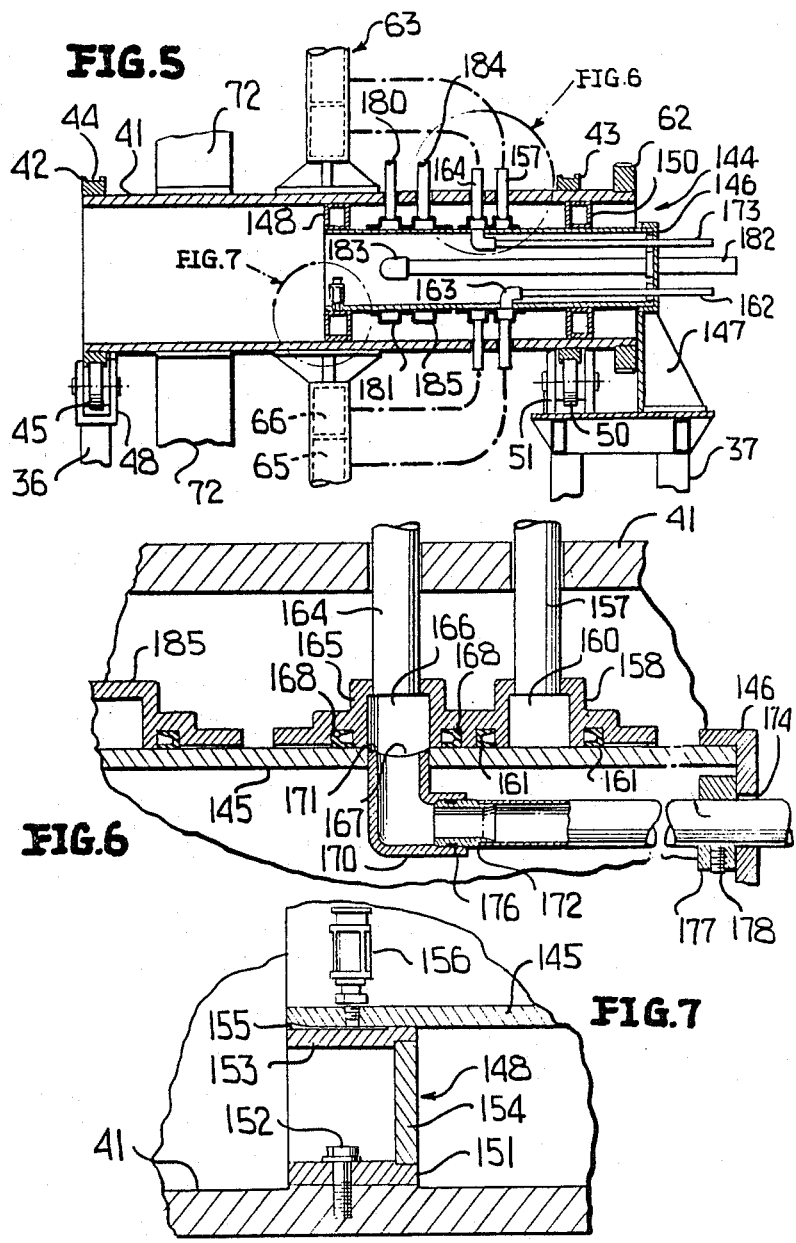

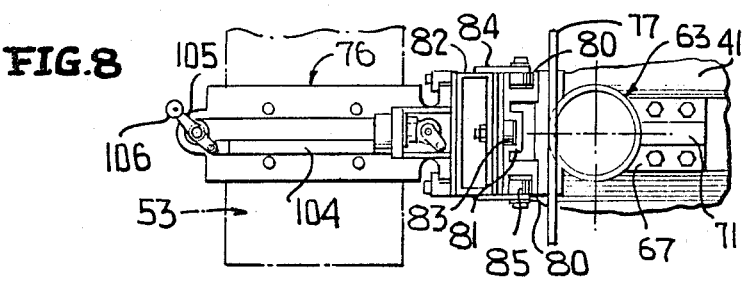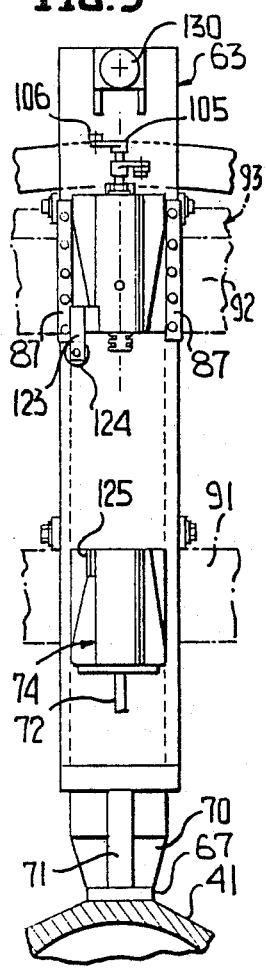

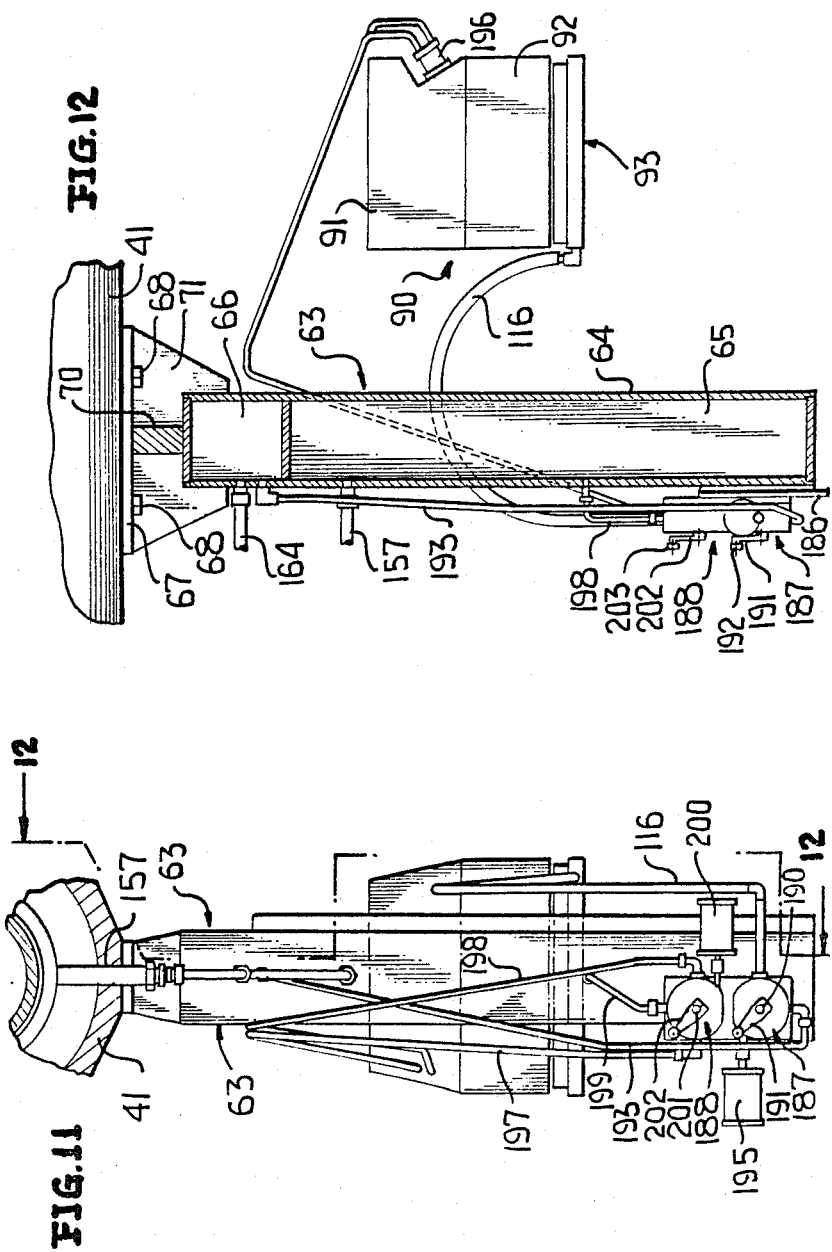

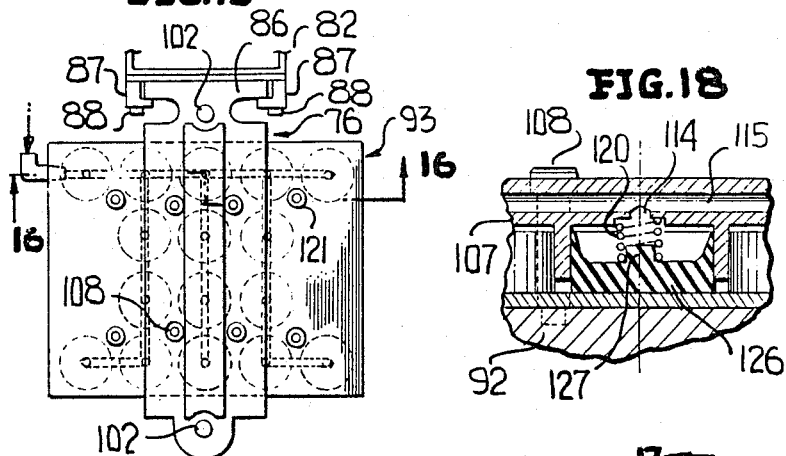

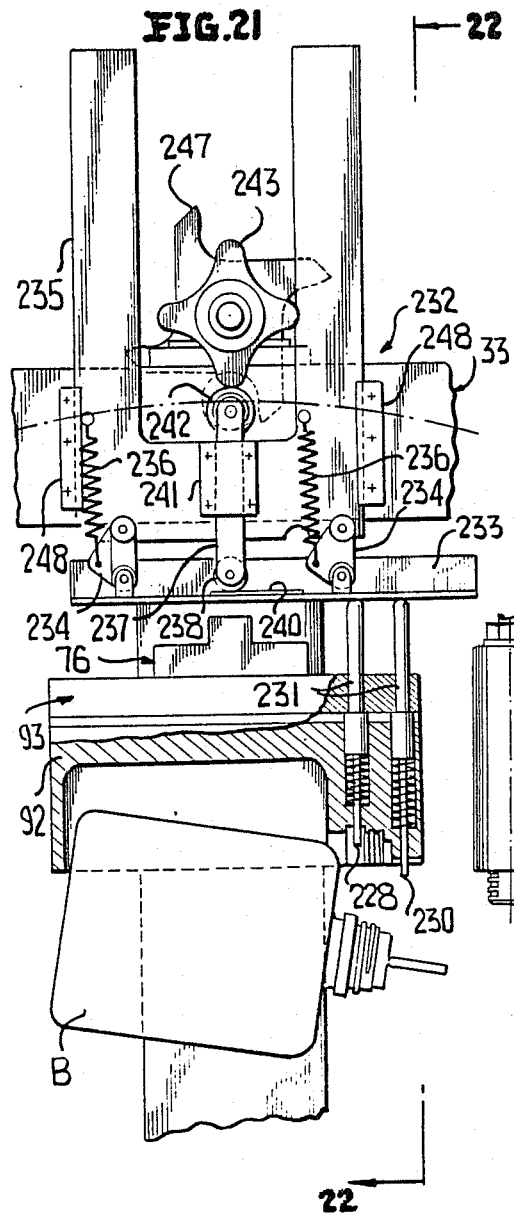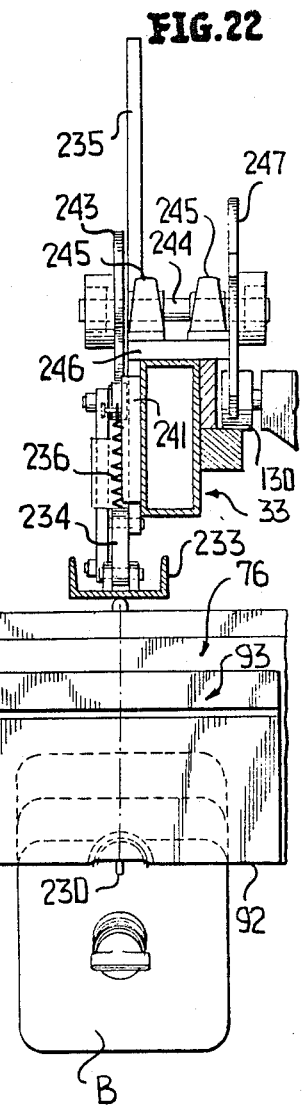

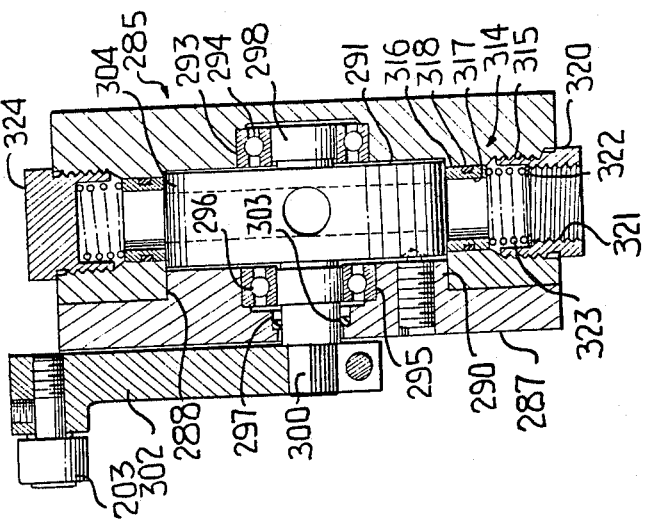
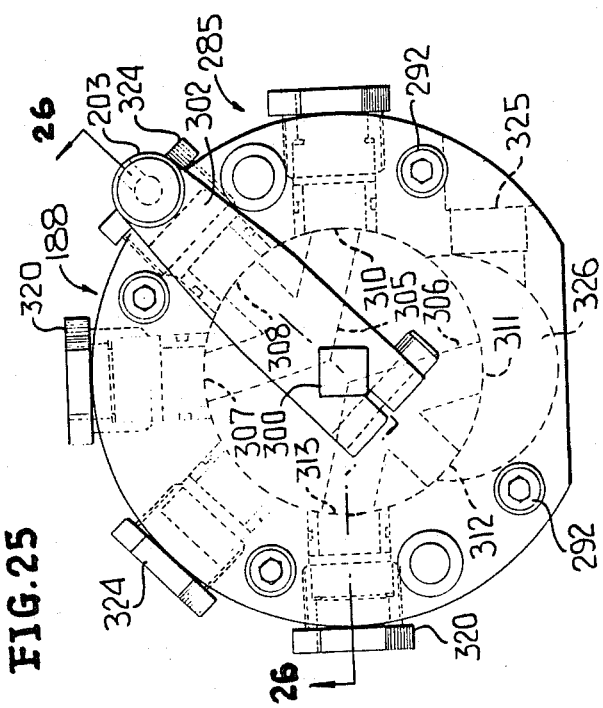

BLOW MOLDING MACHINE

This is a division of application Ser. No. 103,690, filed Dec. 14, 1979, now U.S. Pat. No. 4,650,412.

This invention relates in general to new and useful improvements in blow molding machines, and more particularly to a blow molding machine especially adapted for the blow molding of large containers.

The blow molding machine of this invention incorporates a large number of features. Among these is a tubular main shaft which is mounted in self-aligning trunnion bearings and is held in position for rotation about a fixed axis solely by its own weight and the weight of the components carried thereby.

Another feature of the invention is the direct mounting, by way of replaceable supports, of inner mold holders on the main shaft and the mounting of outer mold holders on spokes for radial opening and closing movements, there being one spoke for each set of mold holders.

Another feature of the invention is the utilization of the spokes as air accumulators whereby air required during each operating cycle is in the necessary supply immediately adjacent a respective mold unit.

Another feature of the invention is the mounting of the outer mold holder on its respective support by means of a track carried by the support and a carrier mounted on the track so that the carrier is rigidly associated with the track while being free for radial movement thereon.

Another feature of the invention is the mounting of an inner mold holder on its associated carrier for radial adjustment wherein mold units of different radial thicknesses may be readily mounted within the mold holders.

Another feature of the invention is the mounting on the carrier of an actuator in the form of a cam follower, the actuator serving to cooperate with the cams to effect the opening and closing of the mold units, to cooperate with a knock-out star wheel for positioning a knock-out shoe to effect the operation of knock-out rods, to operate a control switch for varying the extrusion of tubing being supplied to the molding machine as a continuous preform, and to cooperate with a guide in the event of failure of the mold holders to lock so as to prevent undue separation of the mold holders and to actuate a machine shut-down switch in the event of an unlatched condition.

Another feature of the invention is the specific provision of a knock-out shoe which is mounted for radial movement and which is actuated in timed relation to the positioning of a mold unit relative thereto by means of a rotary star wheel engageable by the actuator carried by the carrier of an associated outer mold holder with the star wheel driving a cam which, in turn, drives a positioning rod for the knock-out shoe.

Another feature of the invention is the provision of a drive for an electrical switch unit controlling the extrusion head for extruding a continuous tube to vary the wall thickness of the tube, the switch being actuated by actuators carried by the various carriers which engage a star wheel and which star wheel drives the control switch and wherein there is a cam for assuring the retention of the drive for the control switch in a preset position at the end of each operating cycle.

Another feature of the invention is the provision of means for locking together cooperating mold holders to effect the closing of a mold unit carried thereby, the locking means including an interrupted screw and an interrupted nut which are axially telescopable and wherein locking can be effected with only a quarter-turn of the locking screw.

Another feature of the invention is the provision of control valves in the cooling system for the mold units wherein coolant flow to and from the mold units may be readily adjusted to provide for uniform temperature in the mold units.

Another feature of the invention is the provision of a manifold arrangement which eliminates the customary rotary joints and wherein there is a fixed manifold sleeve within the main shaft which is engaged by a plurality of rotatable manifolds sealed to the manifold sleeve for transfer of gases and coolants without losses.

Another feature of the invention is the incorporation in the manifold arrangement of a coupling between a manifold line and the manifold sleeve wherein the manifold line may be readily disassembled by axial movement while at the same time the necessary seal is maintained during the operation of the machine.

Another feature of the manifold arrangement is the securement of lines to the manifold sleeve in a manner wherein the lines may be readily coupled and disconnected while maintaining the required seal during operation of the machine.

Still another feature of the manifold arrangement is the mounting of the manifold sleeve within the main shaft in a manner wherein the manifold sleeve may be readily removed through one end of the main shaft to facilitate replacement of seals and like repairs.

Another feature of the invention is in the mounting of that portion of a cam track for effecting closing of the mold units so that in the event of jamming the cam track portion will pivot to an out-of-the-way position. A variable pressure air cylinder is used to resist pivoting.

Most particularly, there has been provided an air cushioning pad mounted between one of the mold halves and its associated mold holder which assures the necessary closing pressure on the mold halves while preventing jamming, the cushioning pad having a plurality of air cylinders which are normally inoperative and are operative only after the mold holders are moved to closed positions and locked in place, the inner cylinders including pistons which are normally lightly spring urged toward an associated mold half so as to maintain only a light pressure assuring the proper closing of the mold halves. The air cushioning pad permits the mold opening and closing mechanism to be of a relatively lightweight construction in comparison to the bulk of the large size molds which are being open and closed.

A further feature of the invention is the formation of the main frame of the machine in two halves to facilitate transport and to provide the frame with a suitable hoist arm which permits the ready replacement of molds.

Another feature of the invention is the mounting of the support frame on supports which are vertically adjustable so as to lift the machine and facilitate the positioning thereof.

With the above and other objects in view that will hereinafter appear, the nature of the invention will be more clearly understood by reference to the following detailed description, the appended claims, and the several views illustrated in the accompanying drawings.

BRIEF DESCRIPTION OF THE DRAWINGS

FIG. 2A is an enlarged fragmentary sectional view showing the details of a brake arrangement of the machine.

FIG. 5 is an enlarged fragmentary sectional view through the main shaft of the machine, and shows generally the mounting thereof and the details of the manifold arrangement.

FIG. 6 is an enlarged fragmentary sectional view showing more specifically the details of the manifold arrangement identified in FIG. 5 by reference to FIG. 6.

FIG. 7 is an enlarged fragmentary sectional view showing the mounting of the manifold sleeve in fixed relation to the rotatable main shaft with reference being had to FIG. 7 in FIG. 5.

FIG. 8 is a fragmentary top plan view showing the general details of the mounting of an outer mold holder.

FIG. 9 is an enlarged fragmentary end elevational view through one mold unit, and shows the details thereof and the associated mold holders and support therefor, the view being taken generally along the direction of the arrow making reference to FIGS. 8, 9 and 10 in FIG. 3.

FIG. 10 is a side elevational view of the apparatus of FIG. 9, and shows more specifically the details thereof.

FIG. 11 is an enlarged fragmentary end elevational view showing generally the details of one of the accumulator spokes of the machine and the arrangement of air control valves carried thereby, the view being taken generally in the direction of the arrow making reference to FIGS. 11 and 12 in FIG. 3.

FIG. 12 is a fragmentary vertical sectional view taken generally along the line 12—12 of FIG. 11, and shows more specifically the details of one of the spokes and the air lines coupled thereto and to the valves carried thereby.

FIG. 15 is a top view of one of the mold holders and shows the mounting of a mold unit and a cushioning pad therein.

FIG. 16 is a fragmentary vertical sectional view taken generally along the line 16-16 of FIG. 15, and shows generally the construction of the cushioning pad and the mounting thereof with respect to the mold holder and an associated mold half.

FIG. 17 is a fragmentary vertical sectional view taken generally along the line 17—17 of FIG. 16, and shows more particularly the constructional details of the cushioning pad.

FIG. 18 is a fragmentary sectional view taken through a modified form of cushioning pad.

FIG. 21 is an enlarged fragmentary front elevational view with parts in section in the area identified by the arrow with reference to FIGS. 21 and 22 in FIG. 1, and shows the details of a knock-out shoe.

FIG. 22 is a fragmentary end elevational view taken generally along the line 22—22 of FIG. 21, and shows further the details of the knock-out shoe.

FIGS. 25 and 26 are elevational and sectional views of an air control valve.

DETAILED DESCRIPTION OF THE DRAWINGS

Figure 1:
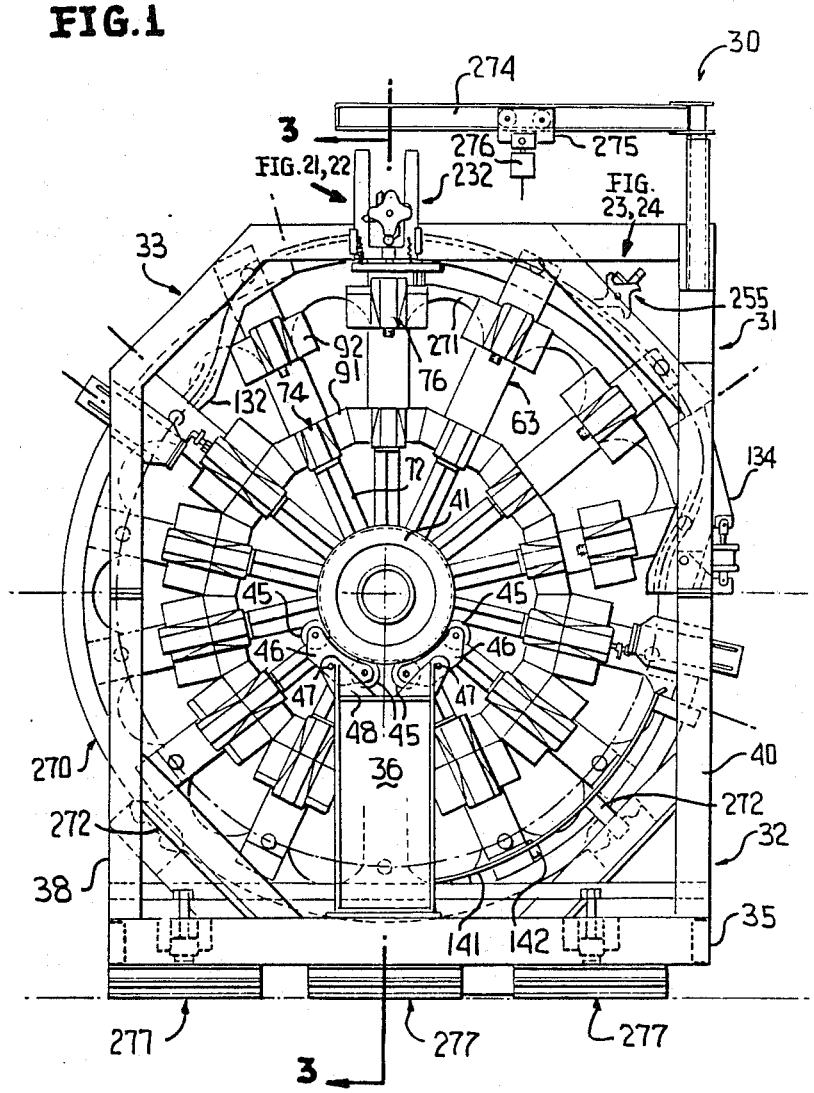
FIG. 1 is a schematic end elevational view of the molding machine, and shows generally the arrangement of the components thereof.

Referring now to the drawings in detail, it will be seen that there is illustrated the blow molding machine which is the subject of this invention, the machine being generally identified by the numeral 30. The machine 30 is particularly adapted for the blow molding of large containers on the order ranging from one gallon to five gallons, although other size containers are possible products.

The blow molding machine 30 includes a frame which is generally referred to by the numeral 31. The frame 31 is formed in three basic sections including a bottom section, generally identified by the numeral 32, and two upper sections 33 and 34. The height of the frame 30 is such that it cannot be moved through buildings in the normal manner, and therefore, when shipped, the machine 30 is dismantled and the top frame sections 33 and 34 are removed from the bottom frame section 32.

Figure 3:
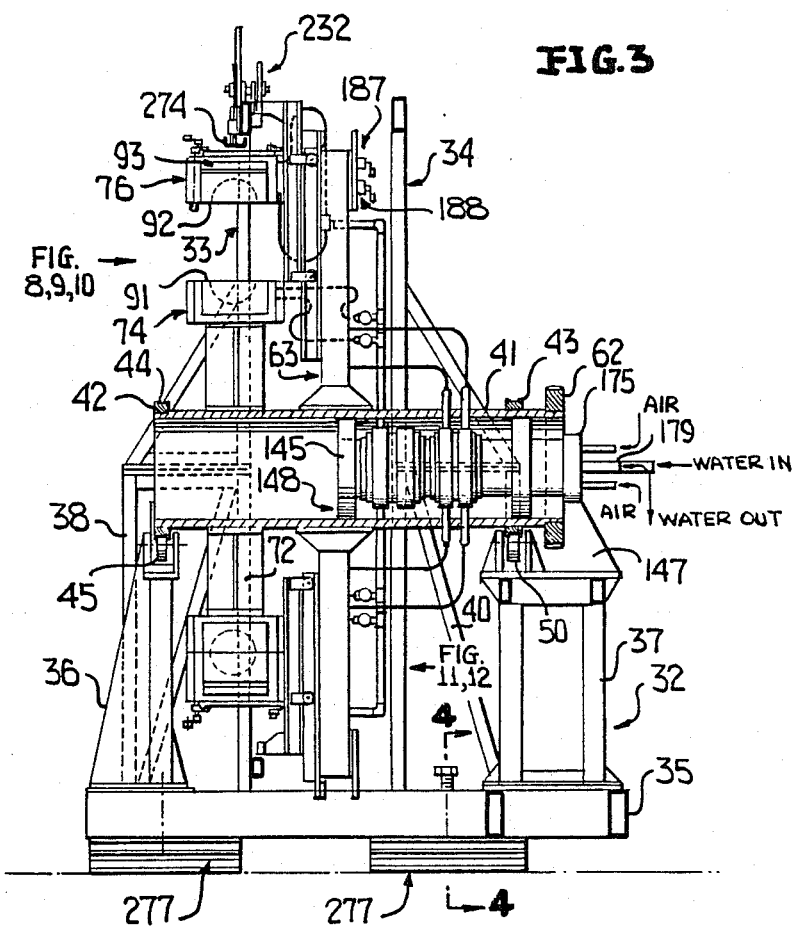
FIG. 3 is a vertical sectional view taken through the central portion of the machine of FIG. 1, and schematically shows the components of the machine.

The bottom frame section 32 includes a generally rectangular base 35 which has extending upwardly from the central portion thereof at the opposite ends a support section 36 and a support section 37, as is best shown in FIG. 3. In addition, at opposite ends and at the front and rear, the bottom frame section 32 includes upstanding support components 38 and 40 as is best shown in FIG. 1.

The machine is provided with a main shaft which is best illustrated in FIG. 3 and is identified by the numeral 41. The main shaft 41 carries a pair of support rings 42, 43 which provide a generally channel-shaped bearing surface 44. The support ring 42 is supported by a plurality of wheels or rollers 45 which are mounted in pairs and supported from the support section 36. It is to be noted that each pair of wheels or rollers 45 is carried by a support shoe 46 which is pivotally mounted by means of a pivot pin 47 on a generally U-shaped bracket 48. The support shoes 46 thus permit the wheels 45 to be self-aligning.

The bearing ring 43 is carried by another set of wheels or rollers 50 which are also four in number and are arranged in two sets of two wheels each. Each set of wheels 50 is carried by a generally U-shaped mounting shoe 51 which is mounted on a pivot pin 53 carried by a U-shaped support 54.

It is to be understood that the main shaft 41 is freely seated on the wheels 45 and 50 and is maintained in place by gravity alone.

At this time it is pointed out that the end support 37 includes a platform 57 on which there is mounted a drive motor 58 coupled to a right-angle reduction unit 60 which carries a drive gear 61 which meshes with a ring gear 62 secured to the main shaft 41.

The main shaft 41, while it is generally circular in cross section, has formed on the exterior surface thereof a plurality of flats, there being one flat for each of the plural stations of the machine. In the illustrated embodiment of the invention there are fourteen stations, although this number may be varied. To each flat there is fixedly secured a radially extending spoke 63 as is best shown in FIGS. 11 and 12. Each spoke 63 includes a tubular member 64 which is hollow and of a sealed construction so as to define two separate accumulators 65 and 66 to be described hereinafter. Each spoke 63 includes a mounting plate 67 which is fixedly secured to the main shaft 41 by way of bolts 68. The base plate has secured thereto a support block 70 to which the tubular member 64 is secured. There are also brace plates 71 so as to provide a very rigid structure.

It is to be understood that at each molding station there will be a mold assembly which will be most specifically described hereinafter. It is to be understood, however, that, as is best shown in FIG. 10, associated with each of the spokes 63 and in axially spaced relation with respect thereto but secured to the same flat of the shaft 41 is a replaceable inner mold holder support 72. The support 72 is removably secured to the main shaft 41 by bolts 73 and is preferably in the form of a structural section so as to have great rigidity. An inner mold holder, generally identified by the numeral 74, is removably bolted to the outer end of the support 72 by means of bolts 75.

The spoke 63 functions as a support for an outer mold holder, generally identified by the numeral 76. It is to be understood that the outer mold holder 76 must be perfectly aligned with the inner mold holder 74 and must be radially movable with respect thereto to facilitate the opening and closing of a mold unit to be carried by the holders.

In accordance with this invention, the spoke 63 has secured to that face thereof adjacent the support 72 a plate 77 which, in turn, has secured to the opposite face thereof a track 78. The track 78 is of a configuration to define at the opposite edges thereof a guideway 80 and in the face thereof remote from the plate 77 a guideway 81. The guideways are best shown in FIG. 8.

Associated with each track 78 is a carrier 82 which is mounted on the track 78 for movement along the track 78 in a radial direction. The carrier may be of any rigid beam-like construction and is provided in the center thereof with two radially spaced rollers 83 which are positioned within the guideway 81. Pairs of supports 84 are secured to opposite edges of the carrier 82 and each support 84 carries a roller 85 which is engaged in a respective one of the guideways 80. In this manner the carrier 82, which is retained in face-to-face sliding engagement with the track 78, is accurately guided for the required radial movement necessary for the opening and closing of a mold unit carried by the mold holders 74, 76.

The outer mold holder 76 is adjustably mounted on the carrier 82 for movement with the carrier 82.

With reference to FIGS. 8 and 15, it will be seen that at one side thereof, that side which is adjacent the spoke 63, the outer mold holder 76 includes a mounting flange 86. The mounting flange 86 is in face-to-face engagement with the carrier 82 and along opposite sides thereof there are L-shaped clamps 87 which are secured to the carrier 82 by a plurality of bolts 88. When tightened, the bolts 88 clamp one leg of the clamp 87 against the flange 86 as is best shown in FIG. 15, and rigidly mounts the mold holder 76 on the carrier 82 for movement therewith.

At this time it is pointed out that the machine 30 is adapted to receive a plurality of interchangeable molds and, where necessary, interchangeable mold holders so that the machine may mold containers of different sizes as indicated above. It will be apparent that the molds must open sufficiently for the molded bottles to be removed therefrom. It is also apparent that the outer mold holders 76 must be mounted on their carriers 82 so that they can move with the carriers 82 to the mold opening positions. Therefore, while in most instances the outer mold holders 76 may be adjusted on the carriers 82 to compensate for different radial thicknesses of the molds, it is to be understood that basically the parting line of the mold halves must be at a constant distance from the axis of the main shaft 41 so as to be in alignment with a parison to be received therein, the parison being in the form of a customarily extruded tube as is conventional with machines of this type. Therefore, normally when there is a change in the molds where the parting lines of the molds are materially shifted beyond the capacity of shifting for the extruder, it is necessary to replace the supports 72 by either shorter or longer supports depending on mold size.

In operation, the assembled mold unit is seated on the support 72 and then clamped in position on its respective carrier 82.

Figure 20:
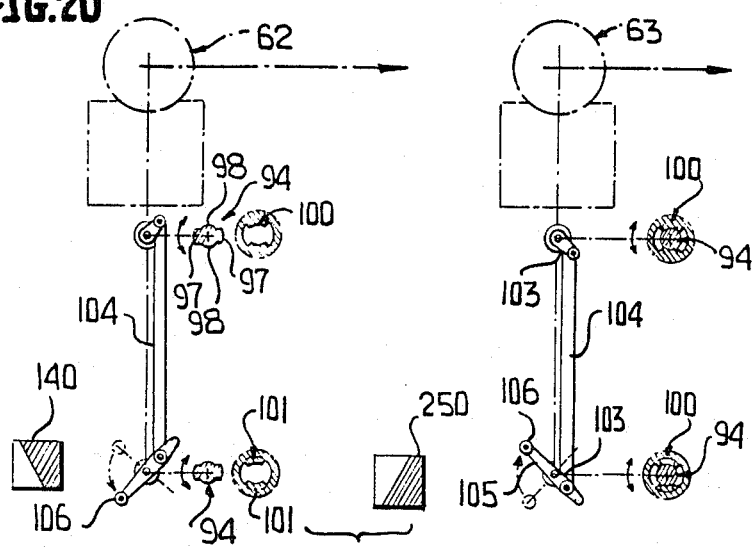
FIG. 20 is a schematic view showing the arrangement of the locking means for a pair of cooperating mold holders in unlocked position and then in locked position.

It is to be understood that the molds per se in no way form a part of this invention. However, each mold unit, generally identified by the numeral 90, includes an inner mold half 91 and an outer mold half 92 which will be seated in the mold holders 74 and 76, respectively. The inner mold half 91 will be rigidly bolted in place on the mold holder 74 while the outer mold half 92 will be floatably mounted within the outer mold holder 76 for limited radial movement and will be carried by a compression pad 93. When the mold holder 76 moves radially outwardly, the mold half 91 remains stationary while the ld half 92 moves radially outwardly with it. In order that the mold halves 91, 92 may be prevented from separating during the blow molding of an article therein, it is necessary that the mold holders 74 and 76 be locked together. Accordingly, each side wall portion of the mold holders 76 is provided with a locking bolt 94 as is best shown in FIGS. 10 and 20. Each locking bolt 94 has a shaft portion 95 which extends through the respective side or leg of the mold holder 76 and is journalled therein for rotation. The lower end of each of the locking bolts 94 is in the form of a thread segment 96, i.e., it includes diametrically opposite thread parts 97 separated by inwardly recessed arcuate surfaces 98, as is best shown in FIG. 20.

The inner mold holder 74 is provided with a locking nut 100 in the form of a sleeve fixedly mounted therein. The outer end of the locking nut 100 is provided with interrupted threads 101 in the manner best shown in FIG. 20. The relationship of the interrupted threads 97 and 101 is such that when properly oriented so that the thread portions 97 and 101 are out of alignment, the thread portion 96 may be telescoped axially into the end of the nut 100. Then, with a rotation of the locking bolt 94 through a 90° arc, complete intermeshing of the threads can be obtained and a complete locking of the bolt 94 to its associated nut 100 can be effected.

Each of the locking bolts 94 extends upwardly through the outer mold holder 76 and terminates in a shaft portion 102. Each shaft portion 102 has fixedly secured thereon a lever 103 with the levers being joined by a link 104 so that the two locking bolts 94 are rotated in unison. In addition, the shaft portion 102 of the locking bolt 94 disposed remote from the spoke 63 is provided with an actuating lever or crank 105 which carries a cam follower 106 for actuation by fixed cams to be described in detail hereinafter.

Reference is now made to FIGS. 15-17 wherein the details of the cushioning pad 93 are shown. First of all, it is to be noted that the mold holder 76 is relatively narrow in a direction transversely of the machine as compared to the cushioning pad and the mold units 90. Thus the cushioning pad 93 extends to opposite sides of the mold holder 76, as is clearly shown in FIG. 15.

The cushioning pad 93 is in the form of a solid block of metal which defines a pad member 107. The pad member 107 is rigidly secured to the central portion of the mold holder 76 by a plurality of bolts 108, as is clearly shown in FIGS. 15 and 16.

The opposite surface of the cushioning pad 107 from that which engages the mold holder 76 has formed therein a plurality of bores 110 each of which defines a cylinder. Each bore 110 opens through the face of the pad member 107 and adjacent that face there is an annular groove 111 in which there is mounted a sealing ring 112. At the bottom of each bore or cylinder 110 is a smaller diameter bore 113 and opening into this bore is an air passage 114 which, in turn, opens into an air main 115 to which there is coupled an air line 116.

In each of the cylinders 110 there is a relatively short or flat piston 117 which has formed in the inner face thereof a bore 118 which is aligned with and corresponds in diameter to the bore 113. A light compression spring 120 has its opposite ends seated in the aligned bores 113, 118.

The outer mold half is secured to the pad member 107 by means of shoulder bolts 121 which provide for limited radial movement between the inner mold half 92 and the cushioning pad 93.

As is best shown in FIG. 16, when the outer mold half 92 is assembled with the cushioning pad 107, there is a clearance 122 between the cushioning pad and the outer mold half. This clearance is maintained when the mold unit 90 is in its open condition by the light pressure of the springs 120, so that the pistons 117 remain in contact with the outer surface of the outer mold half 92 to maintain the spacing 122.

It is to be understood that when the outer mold holder 76 moves radially inwardly and is locked to the inner mold holder 74 in a manner to be described hereinafter, there is a limited compressing of the springs 120 accompanied by a limited movement of the pad member 107 and the outer mold half 92 together. This assures the mating engagement of the mold halves 91, 92. After the mold holder 76 has been locked to the mold holder 74, air under pressure is admitted through the pad member 107 into each of the cylinders 110, thereby through the pistons 117 urging the outer mold half 92 away from the pad meter 107 with a force greater than that which will be effected within the mold unit 90 during the blow molding of an article within the mold unit.

At this time reference is made once again to FIG. 9 wherein there is shown a guide unit on opposite ends of the mold holder 76 for assuring alignment of the locking bolts 94 and the locking nuts 100. A bracket 123 depends from the mold holder 76 and carries a cam follower or other type of roller 124. A hard-faced insert 125 is carried by the mold holder 74 for engagement by the roller 124. The roller 124 and the insert 125 serve to take care of any possible minor misalignment of the mold holders 74, 76.

Reference is now made to FIG. 18 wherein a slightly modified form of piston 126 is illustrated. The piston 126, instead of being a solid plug-like member, is of a generally cup-shaped configuration and has projecting from the rear face thereof a stem 127 about which the compression spring 120 is centered. The piston has a skirt portion expandable under pressure to form a seal, thereby eliminating sealing rings.

Referring once again to FIG. 10, it will be seen that each carrier 82 is provided at the outer end thereof with a mounting bracket 128 which carries an actuator in the form of a cam follower 130. The actuator 130 serves numerous purposes, as will be described hereinafter. However, its main function is to effect the opening and closing of the mold units by moving the carrier 82 radially outwardly and inwardly along its associated track 80.

Figure 19:
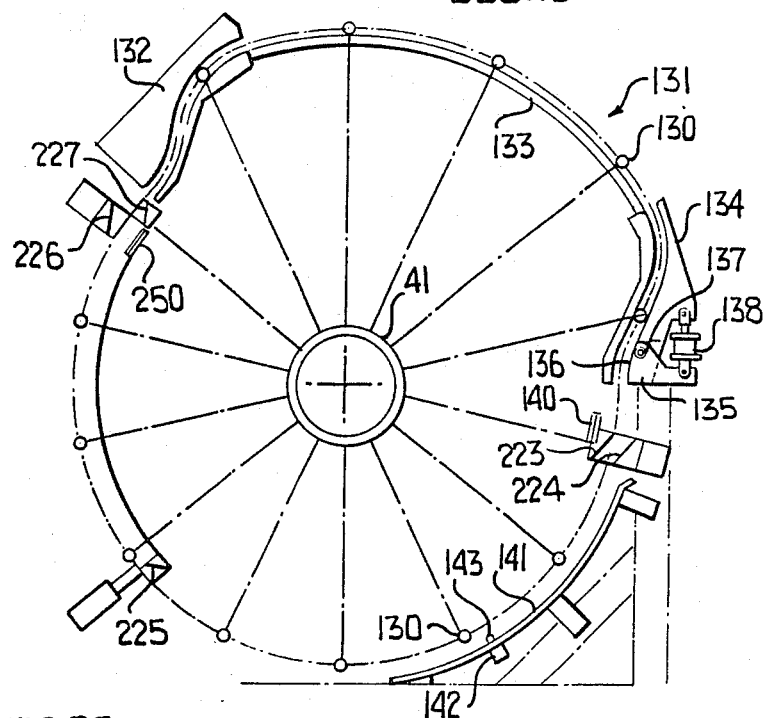
FIG. 19 is a schematic view showing the arrangement of various actuating and control cams and a guide.

Referring now to the schematic showing of FIG. 19, it will be seen that there is illustrated a cam assembly generally identified by the numeral 131. The cam assembly 131 is carried by the upper frame section 33 and is rigidly fixed with respect thereto. The cam assembly 131 includes a cam section 132 which receives the actuator 130 and moves the same radially outwardly to effect a radial outward movement of the carrier 82 and the mold holder 76 and the mold half 92 carried thereby.

Next to the cam section 132 in the direction of rotation of the main shaft 41 is a cam track 133 in the form of a guide which merely serves to hold the carrier 82 in its radially outer position.

Finally, the cam assembly 131 includes a cam section 134 which is configurated to receive the actuator 130 and move the carrier 82 radially inwardly to a position where the outer mold holder 76 is generally seated on the inner mold holder 74. The cam section 134 is provided with an insert 135 which defines an outer surface 136 of the cam track formed therein at the point where a final closing action is effected. The insert 135 is mounted on a pivot 137 for swinging movement of the cam surface to an out-of-the-way position in the event of jamming. For example, should a prior formed molded article not be ejected from the mold unit or should there be some other reason for not permitting the mold holder 76 to move to its final radial inward position, rather than have the machine jam and destroy valuable equipment, the insert 135 pivots to an out-of-the-way position.

The insert 135 is held in its operative position by means of a small fluid cylinder 138 which is coupled at one end to the insert 135 and at the opposite end to a main part of the cam section 134. Although no details have been illustrated, should it be so desired the fluid system (not shown) associated with the cylinder 138 may have incorporated therein conventional signal means for shutting down the machine when the insert 135 is pivoted beyond an allowable position.

Referring particularly to FIG. 19, it will be seen that the frame 21 carries at approximately the 4:00 o'clock position a cam 140 which as schematically shown in FIG. 20 is engaged by the cam follower 106 as the respective outer mold holder 76 passes the cam 140 to pivot the crank 105, in turn to rotate the locking bolts 94 and lock the outer mold holder 76 to the inner mold holder 74.

Next adjacent the cam 140 is a guide track 141 which is also carried by the frame 31. The guide track 141 is normally positioned so as to be radially outward of the path of the actuator 130 when its associated outer hold holder 76 is locked to the respective inner mold holder 74. However, should the outer mold holder 76 not be latched to the inner mold holder 74, the guide 141 will limit the radially outward movement of the actuator 130 and thus prevent the full opening of the mold unit 90.

The guide 141 has incorporated therein a switch 142 with an actuator 143 disposed in the path of the actuators 130. As the actuator 130 rolls along the guide 141, it will engage the switch actuator 143 and actuate the switch 142 to shut down the machine.

It is to be understood that inasmuch as the machine 30 is a blow molding machine, it is necessary in a customary manner to provide air under pressure, a coolant and a return for the coolant which must be coupled to the mold units 90 as they rotate. Reference is made to FIG. 5 wherein the general details of a manifold assembly, generally identified by the numeral 144, are shown.

The main shaft 41, being tubular and thus hollow, has the manifold assembly 144 positioned therein. The manifold assembly 144 includes a tubular manifold sleeve 145 which is provided with an end cap 146 which, in turn, is secured to a suitable support bracket 147 carried by the side frame section 37. In order that the manifold sleeve 145 may be supported by the main shaft 41 and retained in a centered position with respect thereto, the main shaft 41 carries a pair of axially spaced annular supports 148 and 150 on the interior thereof, the support 148 being at the inner end of the manifold sleeve and the support 150 being disposed adjacent the outer end of the main shaft 41. The supports 148 and 150 are identical, and with reference to FIG. 7, it will be seen that each of the supports includes an outer ring 151 which is bolted to the inner surface of the main shaft 41 by bolts 152. Each support also includes an inner bearing sleeve 153 with the ring member 151 and bearing sleeve 153 being rigidly secured together by an annular plate 154. The bearing sleeve 153 has a recessed outer surface 155 into which lubricant is constantly directed from a lubricator 156. Thus the manifold sleeve 145 may remain fixed while the main shaft 41 rotates thereabout.

It is to be recalled that each of the spokes 63 has separate accumulators 65 and 66 formed therein. Each accumulator 65 has a line 157 rigidly carried by the main shaft 41 and extending into the interior of the main shaft. The line 157 is rigidly connected at its radially inner end to a manifold member 158 which is generally annular and which encircles the manifold sleeve 145. The manifold member 158 has an annular flow passage 160 which will be centered with respect to a supply opening in the manifold sleeve 145 and is sealed to the manifold sleeve on opposite sides of the passage 160 by suitable seals 161. A suitable gas supply line 162 extends through the end cap 146 into the interior of the manifold sleeve and is coupled to an orifice (not shown) in the manifold sleeve by an L fitting 163 (FIG. 5).

A second gas line 164 for supplying a gas under pressure to the accumulator 66 of each spoke extends through the main shaft 41 into the interior thereof, there being one line 164 for each spoke. The inner end of each line 164 terminates in sealed relation to a manifold 165 which corresponds to the manifold 158 and, if desired, may be formed integrally therewith as shown in FIG. 6, although the manifolds 158 and 165 may be separately formed.

Like the manifold 158, the manifold 165 defines an annular passage 166 which is axially aligned with a supply port 167 in the manifold sleeve 145. The manifold 165 also carries suitable seals 168 engaging the manifold sleeve in sealed relation on opposites sides of the passage 166.

A gas under pressure is supplied through the port 167 by means of an L-shaped fitting 170 which has one leg thereof extending into a bore through the manifold sleeve 145 which defines the port and is secured in place by way of, for example, welding 171. The other leg of the fitting 170 extends axially of the manifold sleeve 145 and has slidably received therein a fitting 172 carried by a supply pipe 173. The supply pipe 173 extends loosely through an opening 174 in the end cap 146.

It will be seen that the fitting 172 is provided with a sealing ring 176 so that when it is telescoped within the fitting 170, there is a seal maintained between the two. In order that the fitting 172 may be retained within the fitting 170 against gaseous pressures reacting on the supply pipe 173, the pipe 173 is provided with a collar 177 which is locked in place on the pipe 173 by a set screw 178. The collar 177 reacts against the end cap 146.

It is to be understood that the fitting 163 cooperates with the supply pipe 162 and the manifold sleeve 145 in the same manner as described with respect to the fitting 170.

There is also a coolant line 180 extending through the main shaft 41 for each of the mold units 90. The coolant lines 180 are connected to an annular manifold 181 of the same construction as the manifolds 158, 165 and has coolant supplied thereto through a coolant line 182 through an L-fitting 183 carried by the manifold sleeve 145.

The manifold assembly 144 further includes a coolant return pipe 184 for each of the mold units, the coolant return pipes being rigidly carried by the main shaft 41 and extending through the interior thereof. The coolant return pipes 184 are coupled to yet another manifold 185 which is illustrated as being integrally connected to the manifold 181, although the two manifolds 181 and 185 may be separately formed. A coolant return pipe 179 is coupled to the manifold 185 through the manifold sleeve 145 in the same manner as is the coolant supply pipe 182.

Referring now to FIGS. 11 and 12, it will be seen that at the outer end of each of the spokes 63 on the side thereof remote from the track 80 there is a mounting plate arrangement 186 on which there are mounted control valves generally identified by the numerals 187 and 188. The control valve 187 controls the pressurization of the cushioning pad 93, while the control valve 188 controls the ejection of a conventional blow needle (not shown) into a parison for introducing a blow gas thereinto and also for directing gas into the parison through the blow needle to blow the parison to the form dictated by the configuration of the blow unit 90.

Figure 13:
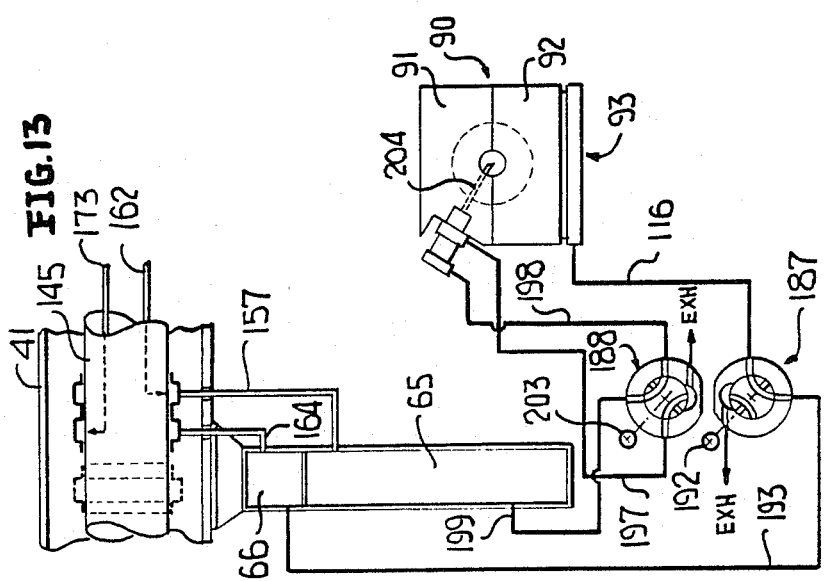
FIG. 13 is a schematic view showing the air line arrangement of the machine for one of the mold units.

The valve 187 is a rotary valve and includes a control shaft 190 having mounted thereon a crank arm 191 which carries a cam follower 192. The valve 187 has coupled thereto a gas (air) supply line 164 which is coupled to the accumulator 66. A line 116 extends from the valve 187 to the cushioning pad 93. Finally, there is an exhaust line which is coupled to an exhaust muffler 195. When actuated by rotation from the dotted line position of FIG. 11 to the solid line position thereof, the valve 187 couples the manifold 66 with the cushioning pad 93 and energies the same, as is best shown in FIG. 13. In the normal position of the valve 187, the line 193 is closed at the valve, and the line 194 is coupled to exhaust.

The mold half 91 carries a conventional needle positioning mechanism and needle cylinder assembly 196 which is not part of this invention. A pair of lines 197 and 198 extending from diametrically opposite parts of the valve 188 are coupled to the needle cylinder assembly 196. A supply line 199 couples the valve 188 to the manifold 65. Finally, there is an exhaust line which is coupled to an exhaust muffler 200.

The valve 188 has a control shaft 201 which is positioned by means of a crank arm 202 which carries a cam follower 203. The valve 188 has three positions, the first shown in solid lines in FIG. 11 and with reference to FIG. 13 wherein the line 197 is connected to exhaust and the line 198 is coupled to the manifold 65 through the line 199. In this position the blow needle 204 is in its projected operative position and the blowing gas (air) is being introduced into the parison clamped within the mold assembly 90.

In the next position where the valve is rotated 45°, the blow needle 204 remains injected within the parison, but the blowing air is vented, the closing of the molten plastic into the blowing hole being prevented by the needle being retained in place.

In the third position, the valve is rotated 90° from the first position at which time the line 198 is connected to exhaust and the line 197 is connected to the accumulator 65 through the line 199. At this time the pressure within the blown article is first relieved and then the needle cylinder assembly controlling the position of the needle 204 is actuated to withdraw the needle. This is the normal inoperative position of the valve 188.

Blow molding machines typically have two separate water passages in each mold half. One passage interconnects the customary neck and tail inserts, and the other passage provides general cooling medium for the balance of the other mold half. Since typically only one source of cooling medium exists, both passages are generally supplied the same amount of cooling medium, resulting in nearly equal cooling effect for the body, neck, and tail of the molded article which is undesired.

The above situation is improved in accordance with this invention by supplying a control valve on the discharge side of each coolant line so as to provide for a throttling effect on the body cooling line to balance its effect against the neck and tail line where material is usually thicker and requires greater coolant per unit of time.

Figure 14:
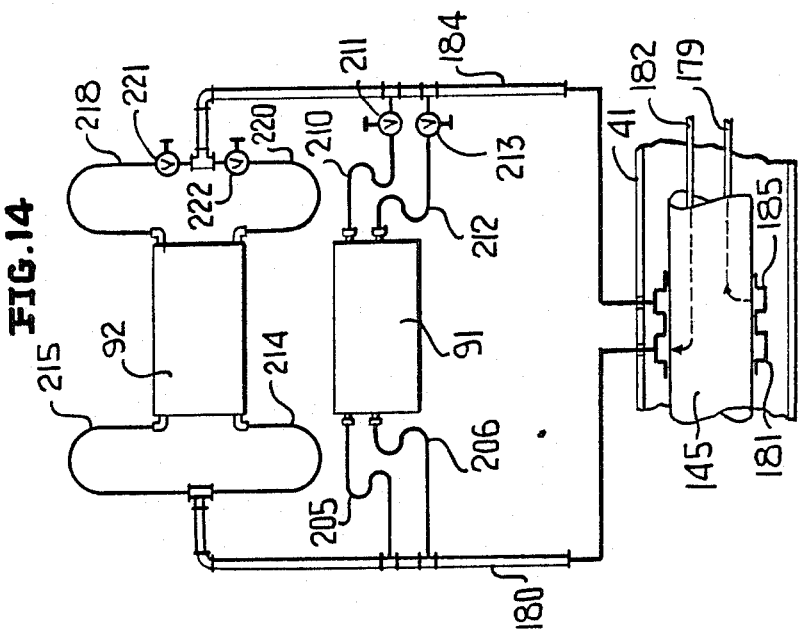
FIG. 14 is a schematic view showing the coolant arrangement for one of the mold units.

With reference to FIG. 14, it will be seen that the coolant supply line 180 is coupled to the inner mold half 91 by two supply lines 205, 206. The mold half 91 also has coupled thereto return lines 210, 212, which are coupled to the return line 184 and have incorporated therein control valves 211 and 213, respectively.

In a like manner, the outer mold half 92 is supplied coolant through supply lines 214 and 215. Return lines 218, 220 having incorporated therein respectively control valves 221, 222 connect the mold half 92 to the return line 184. In this manner separate control of the coolant for cooling the body portion of the molded article and the coolant for cooling the head and tail of the molder article is provided.

Reference is now made once again to FIG. 19 wherein there is illustrated the position of a pair of cam surfaces 223, 224 which are engageable by cam followers 203 and 192, respectively, as the valves 188, 187 pass the fixed cam surfaces to effect a rotation of the valves 90° to their operative positions of FIG. 13. At this time the mold unit 90 has closed about an extruded portion which forms the parison to be blow molded and the needle is injected into the parison and blowing gas is directed through the needle. At the same time, the cushioning pad 93 has expanded to lock the mold halves 91, 92 against separation due to the internal blowing pressures.

The condition remains static until the mold unit has rotated down past the bottom of the machine and has started upwardly, at which time the cam follower 203 engages a cam surface 225 and is rotated in the same direction through an additional 45°, at which time the valve 188 assumes a position wherein introduction of the blowing gas is terminated and the blowing air is vented with the needle remaining in place.

The individual mold unit continues to move upwardly about the axis of the main shaft 41 to an approximately 10:00 o'clock position, at which time the cam follower 192 engages a fixed cam surface 226 followed immediately thereafter by the engagement of the cam follower 203 with a cam surface 227. The result is that the valves 187 and 188 are returned to their original positions where the cushioning pad 93 is exhausted and the blow needle 204 is retracted. The mold unit is now ready to be opened and the blown article discharged therefrom.

Reference is once again made to FIG. 20 wherein there is illustrated a cam 250. The cam 250, with reference to FIG. 19, is located in generally the same position as the cam 226 and is engageable by the cam follower 106 to rotate the crank 105 in a clockwise direction so as to turn the locking bolts 94 to their released positions, as shown at the righthand side of FIG. 20. When the locking bolts 94 are in this position, the mold holders 74, 76 are free to separate and to permit the mold unit 90 to open.

It is conventional to provide a mold with knockouts, and with reference to FIG. 21 it will be seen that the outer mold half 92 is provided with two knock-cut pins 228, 230 for assisting in the removal of a blown article, such as the bottle B, from the outer mold half 92. It is to be understood that the relationship of the blown article with respect to the mold halves 91, 92 is such that the blown article will normally be retained in the outer mold half when the mold is opened.

Each of the knock-out pins 228, 230 is spring urged toward a retracted position and has an actuator rod portion 231 which extends radially outwardly of the outer mold holder 76, as is best shown in FIG. 21. In order to depress the rods 231 and thus project the knock-out pins 228, 230 to the operative position of FIG. 21, there is provided a knock-out mechanism generally identified by the numeral 232. The knock-out mechanism 232 is carried by the upper frame portion 33.

The knock-out mechanism 232 includes a knock-out shoe 233 which is elongated and which is simultaneously engageable with both rods 231. The shoe 233 is carried by a parallel lever arrangement including two levers 234 pivotally connected to the shoe 233 and to a mounting bracket 235. The parallel lever arrangement permits a limited radial movement of the shoe 233 necessary to accomplish the required projection of the knock-out pins 228, 230.

It will be seen that the knock-out shoe 233 is normally maintained in a retracted position by a pair of springs 236 which extend between the bracket 235 and the levers 234. The shoe 233 is urged radially downwardly by means of a rod 237 which is provided at its lower end with a cam follower 238 which rides on a wear surface 240 of the shoe 233. The rod 237 is slidably mounted in a guide 241 carried by a lower portion of the bracket 235 and has at its upper end a further cam follower 242 which is engaged by a generally star-shaped cam 243 which is illustrated as having four lobes.

The cam 243 is fixedly secured to a shaft 244 which is rotatably journalled in bearings 245 carried by a mount 246 which is, in turn, supported by the upper frame portion 33. The shaft 244, in turn, carries a star wheel 247 which has a number of fingers equal to the number of cam lobes on the cam 243. The star wheel 247 is so positioned whereby it is engaged by the actuator 130 of an adjacent mold unit and is rotated through an angle of 90°. This orientation of the cam 243 is such that it has a stationary position wherein the cam follower 242 is positioned between the adjacent lobes and thus the shoe 233 is projected downwardly only when a mold unit is immediately below, as is clearly shown in FIG. 21.

It is to be understood that the knock-out arrangement 232 is radially adjustable. The bracket 235 is of a U-shaped configuration so as to clear the support for the shaft 244 and is radially adjustably mounted in a pair of generally L-shaped clamps 248 carried by the frame portion 33. Thus the bracket 235 may be slid radially inwardly or outwardly as is required properly to position the shoe 233 relative to an adjacent mold to project the knock-out pins 228, 230.

It is to be understood that the cam 243 remains stationary while the radial position of the shoe 233 is adjusted. As a result, it is necessary that rods 237 of different lengths be provided and are interchangeably mounted in the guide 241 in accordance with the mold size.

Figure 23:
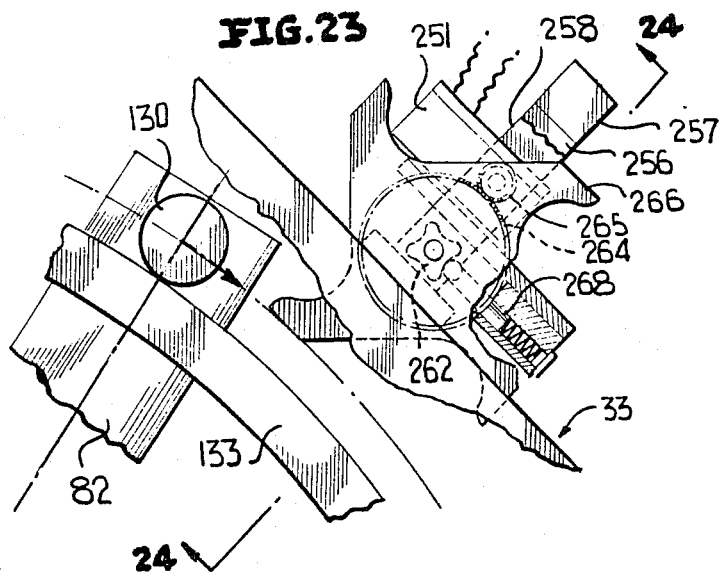
FIG. 23 is an enlarged fragmentary front elevational view taken generally in the area indicated by the arrow with reference to FIGS. 23 and 24 in FIG. 1, and shows the details of a drive for an extruder control switch.
Figure 24:
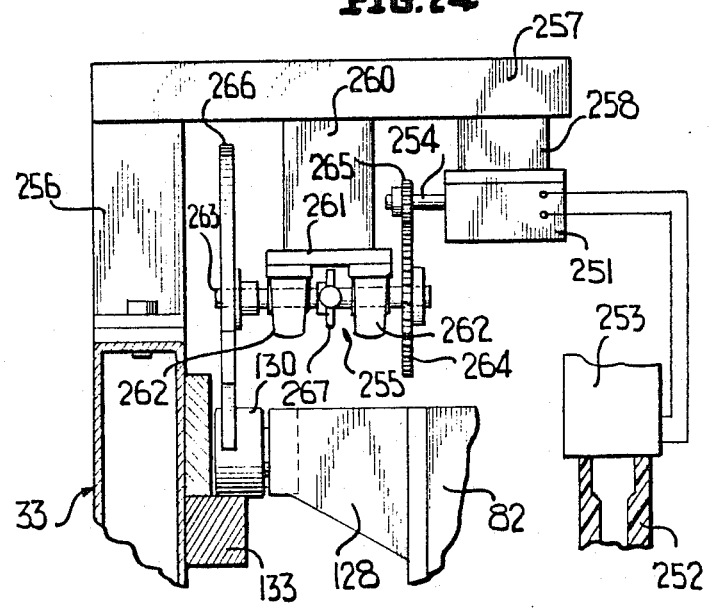
FIG. 24 is an enlarged fragmentary sectional view taken generally along the line 24—24 of FIG. 23, and shows more specifically the details of the drive for the extruder control switch.

Reference is now made to FIGS. 23 and 24 wherein there is illustrated the actuating mechanism for a control switch 251. As set forth above, the parison received by the mold unit 90 is in the form of a continuously extruded tube, the tube being illustrated in FIG. 24 and identified by the numeral 252. The tube 252 is extruded by a conventional extruding mechanism including an extruding head 253 which has a variable orifice so as to permit control of the wall thickness of the extruded tube 252. The variable orifice is electrically controlled by means of a switch 251 which is a conventional, readily available item. The switch 251 is actuated by rotating a shaft 254 thereof.

In accordance with this invention, the actuator 130 is utilized to actuate the switch 251 in timed relation to the rotation of the mold units 90 about the circular path defined by the main shaft 41. The actuator 130 engages and drives a switch control mechanism generally identified by the numeral 255. The upper frame section 33 is provided with a mounting bracket 256 which carries an overhanging arm 257 from which the switch 251 is suspended by a bracket 258. The arm 257 carries a further bracket 260 which, in turn, carries a mounting platform 261. A pair of bearing elements 262 are carried by the support 261 and have rotatably journalled therein a shaft 263.

One end of the shaft 263 carries a drive gear 264 which is meshed with a driven gear 265 secured to the switch shaft 254. The opposite end of the shaft 263 carries a star wheel 266 which is positioned for engagement by the actuator 130 as is clearly shown in FIGS. 23 and 24. It will be readily appreciated that as the actuator 130 passes the star wheel 266, it rotates the star wheel one-quarter of a turn, and thus the gear 264 one-quarter of a turn. However, the relative diameters of the gears 264, 265 are such that the required rotation of the switch control shaft 254 is effected to produce the necessary thinning of the wall of the extruded tube 252.

In order that the switch 251 may be held in a stationary position between engagements of the star wheel 266 by actuators 130, a central part of the shaft 263 carries a cam 267 which, as is best illustrated in FIG. 23, is engaged by an end of a spring loaded rod 268. The cooperation of the rod 268 and the cam 267 serves to hold the shaft 263 in a fixed position.

Inasmuch as the specific thinning of the wall of the extruded tube 252 is one of design for the particular product being blow molded, no attempt will be made here to describe in more detail the control of the wall thickness of the extruded tube 252.

The machine 30 is provided with a brake arrangement to facilitate an almost immediate stoppage of the rotation of the machine in the event of machine failure. As is best shown in FIG. 2, outer end portions of the spokes 63 are joined by a large diameter brake rotor 270 which is formed in plural segments 271 and which segments are suitably removably bolted to the individual spokes.

Figure 2:
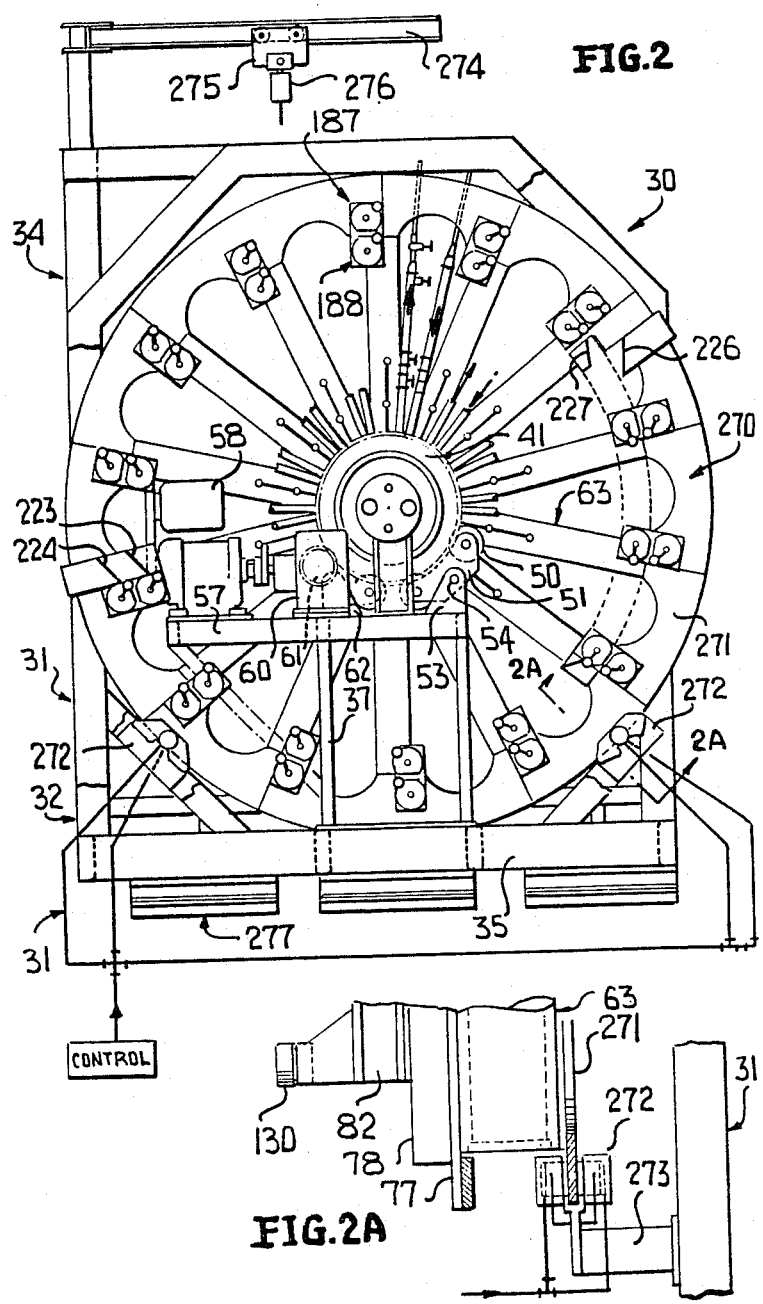
FIG. 2 is a schematic and elevational view of the machine of FIG. 1 from the opposite end of the machine.

As is also best shown in FIG. 2 as well as FIG. 2A, the frame 31 carries two caliper arrangements 272. These caliper arrangements may be of any conventional type and are carried by the frame 31 by means of suitable mounting brackets 273.

By joining the spokes 63 with the rotor 270, the overall assembly becomes much more rigid. At the same time, by having a large diameter rotor a greater braking action is possible. Finally, by mounting the rotor at the outer ends of the spokes 63, there is a maximum load transfer and less stress on other components of the machine than would occur if the rotor 270 were mounted on the main shaft 41, for example.

In accordance with this invention the mold units 90 are mounted in their entirety on the main shaft 41, including the necessary support 72. In order that the mold units may be readily handled, the frame 31 includes a support beam 274 which is carried by the upper frame section 33 and which overlies the positions of the mold units, including the mold holders, as is best illustrated in FIG. 3. The support beam 274 has a trolley 275 mounted thereon for movement, and the trolley 275 may carry any type of hoisting device 276 as may be required.

Figure 4:
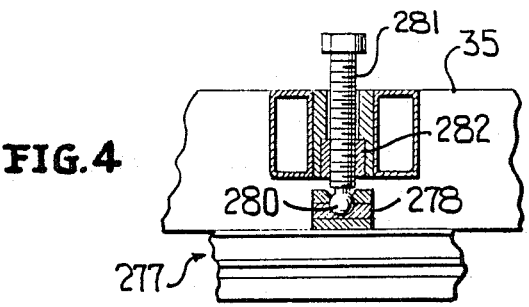
FIG. 4 is an enlarged fragmentary sectional view taken generally along the line 4—4 of FIG. 3, and shows the mounting of the frame of the machine.

In order that the machine 30 may be readily shifted and positioned, the base 35 of the frame 31 is provided with three air lift pads, generally identified by the numeral 277, which are symmetrically disposed. These air lift pads are of a conventional construction and, when actuated, will lift the machine 30 and permit it to be slid across the floor or other supporting surface on which it is seated. In accordance with this invention, in order that the air lift pads 277 may be self-aligning, in lieu of the usual rigid connection between such air lift pads and a machine frame, as is best shown in FIG. 4, each air lift pad 277 is provided with a ball socket mount 280 carried by a mounting bolt 281. The mounting bolt 281 is threaded in a nut 282 secured to the frame base 35 for vertical adjustment of the frame base relative to the lifting pad. Because the lifting pad can rock due to its ball mounting, there can be a more even distribution of the weight of the machine through each lift pad 277 in conditions of uneven floor surfaces and the like.

Reference is now made to FIGS. 25 and 26, wherein there is illustrated the details of a typical valve which may be employed as the valves 187 and 188. For identification purposes, the valve is identified by the numeral 188.

The valve 188 includes a housing, generally identified by the numeral 285 which is formed of two members 286 and 287. The member 286 is generally circular in outline and is provided with a circular recess 288 in one face thereof. The member 287 is of the same configuration as the member 286, and is provided with a projecting plug 290 which seats in the recess 288 and defines with the recess 288 a chamber 291. The member 287 is removably secured to the member 286 by bolts 292.

At the base of the chamber 291, the member 286 is provided with a bore 293 in which there is seated a bearing 294. The plug 290 has a similar bore 295 in which there is seated a bearing 296. The bore 295 has a smaller diameter continuation 297 which is of a stepped configuration.

A shaft 298 is journalled in the bearings 294, 296, and extends out through the bore 297, terminating in a mounting end 300 which carries a crank 302 and in the case of the previously described valve 188 carries a cam follower 203. A seal 303 seals the shaft 298 to the housing member 287.

The shaft 298 carries within the chamber 291 a cylindrical valve element 304. The valve element 304 has formed therein a pair of opposed arrow-shaped passage arrangements 305, 306 as is best illustrated in FIG. 25. The passage arrangement 305 provides three ports 307, 308 and 310 which open through the periphery of the valve element 304 in 45° spaced relation. In like manner, the passage arrangement 306 provides ports 311, 312 and 313 which open through the periphery of the valve element 304 also in 45° spaced relation with adjacent ports of the two passage arrangements 305 and 306 being spaced 90°.

In the illustrated embodiment of the invention the housing member 286 is provided with five radiating ports 314 which are of a stepped configuration and include an enlarged outer portion 315 and a smaller diameter inner portion 316. In the inner portion 316 there is slidably mounted a port sealing element 317 which has an inner end conforming to the periphery of the valve element 304 and a square-cut outer end. The port sealing element is sealed relative to the housing member 286 by a sealing ring 318. A threaded fitting 320 is threaded in the outer portion 315 of each port 314. The fitting 320 is provided with internal threads 321 for receiving another fitting, and further has an internal shoulder 322. A compression spring 323 extends between the shoulder 322 and the port sealing element 317 resiliently to urge the port sealing element 317 against the outer periphery of the valve element 304.

As is best shown at the top of FIG. 26, the threaded fitting 320 may be in the form of a plug which is identified by the numeral 324. The plug 324 differs from the fitting 320 only in that it does not have the internally threaded bore 321 for receiving another of the fittings.

The housing member 286 is also provided with an exhaust port 325 which does not open directly against the valve element 304. The exhaust port 325 opens into a large cavity 326 which has a circumferential extent in excess of 90° and is selectively aligned with the ports 310, 311 and 312 in the operation of the valve.

With reference to FIG. 13, it will be seen that in practice the valve 188 will have the fittings 320 at the 12:00 o'clock, 3:00 o'clock and 9:00 o'clock positions, and the other two ports 314 will be provided with the plugs 324. Of course, other arrangements are possible depending upon the requirements of the valve.

Although the pistons 117 may directly contact the outer mold half 92 to exert a closing pressure thereon, it has been found advisable to provide a retainer plate 330 which may be a permanent part of the cushioning pad 93. As is clearly shown in FIGS. 16 and 17, the retainer plate 330 is disposed between the pistons 117 and the outer mold half 92.

It is to be noted that the retainer plate 330 is carried by the shoulder bolts 121. Further, the shoulder bolts 121 are provided adjacent the shoulders thereof with annular grooves 331. The grooves 331 are intended for reception of conventional split retainers (not shown) which may be slipped in place after the retainer plate 330 has been slightly retracted on the shoulder bolts 121 from the position illustrated in FIG. 16.

It will be seen that in normal usage the retainer plate 330 serves as a pressure pad for the pistons 117 to exert an overall even pressure on the outer mold half 92. On the other hand, when the retainer plate 330 is retracted and the non-illustrated spring clips are in position, the retainer plate 330 serves to hold pistons 117 against movement out of the pad member 107 against the influence of the springs 120. Thus when the outer mold halves 92 are removed from the cushion pads 93, the cushion pads will remain intact. It is to be understood that the spring clips may be pulled out after the threaded portions of the shoulder bolts 121 have been initially engaged in the respective bores in the outer mold half 92.

Although only a preferred embodiment of the invention has been specifically illustrated and described herein, it is to be understood that minor modifications may be made in the blow molding machine without departing from the spirit and scope of the invention as defined by the appended claims.

We claim:

1. In a blow molding machine having mold halves carried by mold opening and closing means, cushion pad means for assuring tight and complete closing of mold halves under a predetermined loading after an initial closing of the mold halves, said cushion pad means being an air cushion pad, and actuating means for actuating said air cushion pad including an air entry means and an air outlet, said air cushion pad means including a pad member having a mold half opposing surface, a plurality of cylinders formed in said pad member and opening through said mold half opposing surface, and a piston in each cylinder and projectable from said mold half opposing surface for directly engaging an associated mold half, spring elements associated with said pistons for providing an initial loading of pistons, and a retainer plate selectively securable to said pad member for retaining said pistons in said cylinders against the urging of said spring elements.

2. In a blow molding machine having mold halves carried by mold opening and closing means, cushion pad means for assuring closing of mold halves under a predetermined loading, said cushion pad means being an air cushion pad, actuating means for actuating said air cushion pad including an air inlet entry means and an air outlet, said air cushion pad means including a pad member having a mold half opposing surface, a plurality of cylinders formed in said pad member and opening through said mold half opposing surface, a piston in each cylinder and projecting from said mold half opposing surface for directly engaging an associated mold half, spring elements associated with said pistons but providing an initial loading of said pistons, and a retainer plate selectively securable to said pad member for retaining said pistons in said cylinders against the urging of said spring elements.

3. An air cushion pad according to claim 2 wherein said actuating means includes means for operating said air cushion means after closing of the mold halves.

* * * * *